United States Patent

Shors et al.

[11] Patent Number: 5,950,362
[45] Date of Patent: *Sep. 14, 1999

[54] METHOD FOR ENHANCING GERMINATION

[75] Inventors: John D. Shors, Des Moines; David R. Soll; Karla J. Daniels, both of Iowa City; Donovan P. Gibson, Lone Tree, all of Iowa

[73] Assignee: University of Iowa Research Foundation, Iowa City, Iowa

[*] Notice: This patent issued on a continued prosecution application filed under 37 CFR 1.53(d), and is subject to the twenty year patent term provisions of 35 U.S.C. 154(a)(2).

[21] Appl. No.: 08/886,901

[22] Filed: Jul. 2, 1997

[51] Int. Cl.[6] .................................................. A01G 31/00
[52] U.S. Cl. ...................... 47/61; 47/DIG. 9; 47/DIG. 12
[58] Field of Search ................... 47/60, 61, 58.1, 47/DIG. 8, DIG. 9, DIG. 12

[56] References Cited

U.S. PATENT DOCUMENTS

| | | | |
|---|---|---|---|
| 3,307,289 | 3/1967 | Lemm | 47/1.3 |
| 3,499,436 | 3/1970 | Balamuth | 47/1.3 |
| 3,703,051 | 11/1972 | Weinberger | 47/58.1 |
| 3,902,273 | 9/1975 | Friedman | 47/58.1 |
| 4,055,491 | 10/1977 | Porath-Furedi | 47/DIG. 12 |
| 4,055,915 | 11/1977 | Charnoe | 47/58.1 |
| 4,211,744 | 7/1980 | Boucher . | |
| 4,680,889 | 7/1987 | Carlson | 47/58.1 |
| 4,834,789 | 5/1989 | Carlson | 47/58.1 |
| 5,731,265 | 3/1998 | Hou et al. | 47/DIG. 12 |

OTHER PUBLICATIONS

Crawford, A. E., "The Application of High Intensity Sound for the Stimulation of Plant Growth," paper presented at the Spring Conference of the Institute of Acoustics, University of Bath, Apr. 4th–6th 1977, Published in Proceedings of the Institute of Acoustics less figures, ref: 9–3–1/4 (1977).

Weinberger, P. Anderson, P., and Donovan, L. S., "Changes in Production, Yield and Chemical Composition of Corn (*Zea Mays*) after Ultrasound Treatments of the Seeds," Radiation and Environmental Biophysics 16, 81–88 (1979).

Rubtsova, I. D., "Effect of Ultrasound on the Germination of the Seeds and on Productivity of Fodder Beans," Biofizika 12:No. 3, 489–492 (1967).

*Primary Examiner*—Michael J. Carone
*Assistant Examiner*—Yvonne R. Abbott
*Attorney, Agent, or Firm*—Kent A. Herink; Daniel A. Rosenberg; Davis Brown

[57] ABSTRACT

A method of enhancing the germination of seed by immersing the seed in an aqueous solution including dissolved inert gas and sonicating the seed at a frequency preferably of between about 15 kHz and about 30 kHz and an energy density of between about 1 watt/cm$^2$ and about 10 watts/cm$^2$ for a period of between 1 minute and about 15 minutes. The sonicated seed exhibits enhanced germination by a reduction in the time required for germination, an increase in the percentage of total seeds that germinate, and an increase in the percentage of seeds that germinate at reduced temperatures. Plants grown from the treated seeds exhibit improved characteristics.

18 Claims, 4 Drawing Sheets

FIG. 3

| Treatment | Time (hours) | Seeds (number) | Roots (number) | Perimeter (mm) | Area (mm²) | Length (mm) | Width (mm) | Est. Volume (mm³) |
|---|---|---|---|---|---|---|---|---|
| Sonication | 48 | 20 | 17 | 31.3 ± 16.5 | 23.2 ± 16.9 | 15.7 ± 8.2 | 0.9 ± 0.5 | 144.8 ± 150.4 |
| Control | 48 | 20 | 8 | 10.3 ± 11.6 | 6.8 ± 8.1 | 5.1 ± 5.8 | 0.4 ± 0.5 | 34.1 ± 42.6 |
| Fold Difference | | | 2.1 | 3.0 | 3.4 | 3.1 | 2.2 | 4.2 |
| Absolute Difference: | | | | 21.0 | 16.4 | 10.6 | 0.5 | 110.7 |
| Sonication | 56 | 20 | 18 | 43.9 ± 20.5 | 38.1 ± 24.2 | 22.0 ± 10.3 | 1.5 ± 0.5 | 314.1 ± 270.4 |
| Control | 56 | 20 | 15 | 26.8 ± 12.5 | 16.8 ± 12.1 | 13.4 ± 6.2 | 1.1 ± 0.3 | 86.6 ± 102.2 |
| Fold Difference | | | 1.2 | 1.6 - | 2.3 | 1.6 | 1.4 | 3.6 |
| Absolute Difference: | | | | 17.1 | 21.3 | 8.6 | 0.4 | 227.5 |
| Sonication | 72 | 20 | 20 | 66.9 ± 31.1 | 74.3 ± 43.9 | 33.5 ± 15.5 | 2.0 ± 0.6 | 915.5 ± 767.1 |
| Control | 72 | 20 | 20 | 46.4 ± 20.2 | 39.0 ± 21.3 | 23.2 ± 10.1 | 1.6 ± 0.4 | 325.5 ± 292.1 |
| Fold Difference | | | 1.0 | 1.4 | 1.9 | 1.4 | 1.2 | 2.8 |
| Absolute Difference: | | | | 20.5 | 35.3 | 10.3 | 0.4 | 590.0 |

FIG. 4

| Treatment | Time (hours) | Seeds (number) | Roots (number) | Perimeter (mm) | Area (mm²) | Length (mm) | Width (mm) | Est. Volume (mm³) |
|---|---|---|---|---|---|---|---|---|
| Sonicated (stored 3 mos) | 48 | 10 | 5 | 31.1 ± 19.0 | 21.0 ± 19.3 | 15.5 ± 9.5 | 1.2 ± 0.4 | 139.2 ± 196.4 |
| Control (stored 3 mos) | 48 | 15 | 5 | 24.3 ± 3.2 | 12.7 ± 3.6 | 12.2 ± 1.6 | 1.0 ± 0.2 | 46.8 ± 19.6 |
| Fold difference | | | 1.5 | 1.3 | 1.6 | 1.3 | 1.2 | 3 |
| Absolute difference | | | | 6.8 | 8.3 | 3.3 | 0.2 | 92.4 |
| Sonicated | 56 | 10 | 10 | 46.3 ± 16.0 | 37.2 ± 16.1 | 23.2 ± 8.0 | 1.6 ± 0.2 | 287.1 ± 234.0 |
| Control | 56 | 15 | 11 | 21.7 ± 12.4 | 12.7 ± 10.0 | 10.8 ± 6.2 | 1.1 ± 0.3 | 56.6 ± 65.4 |
| Fold difference | | | 1.4 | 2.1 | 2.9 | 2.2 | 1.4 | 5.1 |
| Absolute difference | | | | 24.6 | 24.5 | 12.4 | 0.2 | 230.5 |
| Sonicated | 72 | 10 | 10 | 79.6 ± 24.8 | 78.5 ± 25.9 | 39.8 ± 12.4 | 2.0 ± 0.2 | 1001.2 ± 668 |
| Control | 72 | 15 | 15 | 49.8 ± 13.0 | 40.8 ± 12.8 | 24.9 ± 6.5 | 1.6 ± 0.2 | 321.9 ± 178.5 |
| Fold difference | | | | 1.6 | 1.9 | 1.6 | 1.2 | 3.1 |
| Absolute difference | | | | 29.8 | 37.7 | 14.9 | 0.4 | 679.3 |

METHOD FOR ENHANCING GERMINATION

BACKGROUND OF THE INVENTION

1. Field of the Invention

The invention relates generally to a method for enhancing the germination of seed and, more specifically, to a method of treating seeds with sound waves to accelerate the rate of germination and improve the percentage of total germination.

2. Background of the Prior Art

Modern agricultural practices have improved the productivity of farmland many fold. One of the principal advances that has led to this improvement is the development of improved lines and varieties of agronomically significant plants, particularly hybrid corn varieties. The development of a plant breeding program for improving corn under went an explosive expansion in the last century. Historically, corn was grown as open-pollinated varieties having heterogeneous genotypes. The farmer selected uniform ears from the yield of these genotypes and reserved them for planting the next season. The result was a field of corn plants in which segregation was reduced, i.e., were homozygous, for a variety of traits. This type of selection led to at most incremental increases in seed yield and tended to accumulate deleterious genes.

Large increases in seed yield were the result of the development of hybrid corn varieties in plant breeding programs. The ultimate objective of the commercial corn industry is to produce high yielding, agronomically sound plants, which perform well in certain regions or areas suitable for the production of corn, particularly the United States Corn Belt. Hybrid varieties are not uniformly adapted for all locations, or even for the entire Corn Belt, but are specifically adapted for separate and identifiable regions that have particular soil types, climatic conditions, and other environmental characteristics which affect the selection of corn hybrid varieties for planting and growing. For example, northern regions of the Corn Belt require hybrids with times to maturation that are shorter than those of hybrids that prosper in southern regions of the Corn Belt.

Seed companies, therefore, target hybrid seed corn varieties for different geographical regions. One of the characteristics of corn lines and varieties identified and tracked by corn breeders is the length of time in days of the growth period of hybrid varieties. The growth period in this case is the average length, in days, between the time the cotyledon of the seed of a hybrid variety emerges from the soil and the time the grain produced on the plant is mature and dry enough for harvest. Hybrid varieties with shorter growth periods are generally more suitable for planting in northern geographical regions or areas of higher elevation where temperatures remain colder later in the spring and drop earlier in the fall. The success of the development of specialized hybrid varieties for specific growing seasons is exemplified by the fact that some seed companies break the United States into as many as eleven regions based upon growing seasons varying from 70 to 118 days. In general, a farmer will plant hybrid varieties which have the longest growth period for the area in which the farmer's fields are located. This is because hybrids with longer growth periods will typically yield higher than hybrids with shorter growth periods. The differences in growing seasons targeted by seed companies are only a matter of a few days. Accordingly, shortening the time period between planting and maturity may have significant commercial benefits to farmers and may allow for the cultivation of corn or other crops in new agricultural areas previously unsuitable for crop production.

Corn researchers monitor and select for corn lines which have good germination traits, measuring the germination of seed under cold soil conditions as well under ideal warm, moist conditions. Corn seed typically will not germinate in soil temperatures below 40° F. While the total percentage of seeds that germinate improves as temperatures increase, farmers currently wait until soil temperatures are 50° F. or higher before planting to assure a high percentage of total germination within a reasonably short time period.

Another aspect of seed germination of importance to the seed industry is that germination, particularly germination at colder temperatures, declines with the age of seed. Accordingly, commercial seed corn which has germination characteristics that are commercially acceptable within the first several years following production, may no longer be commercially acceptable after having been warehoused for, say, four or five years. Currently, seed companies will discount such seed and sell it in regions that have warmer spring soil conditions where the percentage total germination will still be commercially acceptable at the discounted price.

The decline of germination with age is also of great concern to seed depositories which accept and maintain, or attempt to maintain, in a viable state, seeds of diverse and perhaps rare species and varieties. While these seed deposits are maintained under carefully controlled conditions which greatly extend the length of time the seed remain viable, the seed depositories must nonetheless periodically grow plants from deposited seed in order to produce fresh seed. Any method which would enhance the percentage of seeds which germinate after being stored for extended periods of time would not only decrease the cost of maintaining viable deposits of seed, but may also mean the difference between survival or extinction of rare species or varieties which are difficult to store and maintain.

Finally, the period of time a seed sits in the soil prior to germination can also affect yield. Ungerminated seeds are prone to bacterial and fungal damage, and may be prone to damage or dislocation due to environmental conditions most notably temperature change and precipitation. A reduction in the period of time to germination i.e., the time between planting and emergence of coleoptile and root from the seed could have a significant impact both on the percent of germination, the heartiness of the plant facilitated by a head-start, and yield.

Seed priming has been attempted in the past through the use of environmentally unsafe chemicals such as polyethylene glycol and concentrated salt solutions. None of these known methods, however, have been found to significantly accelerate the germination of seeds or improve the total germination percentage without adversely affecting the plant produced from the treated seed.

SUMMARY OF THE INVENTION

The invention consists of methods for improving the germination of seeds. Seed to be treated is immersed in water and exposed to sound energy at frequencies between 15 kHz and 30 kHz for periods between about 1 and 15 minutes. The ultrasonic energy generates cavitational forces by the adiabatic collapse of micro-bubbles in the liquid medium, particularly those bubbles that collapse at the surface of the seed. The effect is substantially enhanced by saturating the water with a noble gas such as helium or argon, or combinations of inert gases.

Seed treated by this method germinates approximately two to three days faster than untreated seed, depending upon the genetic make-up of the hybrid. Seed treated by this method maintain a more advanced root system during early development and are expected to maintain an advantage through the growing season. Treated seed can be dried, stored, and germinated at a later date while maintaining its accelerated germination characteristics.

A purpose of the invention is the treatment of seeds to accelerate germination and improve the percentage of germination of the seeds.

Another purpose of the invention is to accelerate germination and improve the percentage of germination of treated seeds that have been dried and stored for an extended period of time.

These and other objects of the invention will be made clear to a person of ordinary skill in the art upon a reading and understanding of this specification, the associated drawings, and appending claims.

BRIEF DESCRIPTION OF THE DRAWINGS

FIG. 3 is a table demonstrating the exponential increase in the absolute difference between the estimated volume of the root system of untreated and treated seed, demonstrating the maintenance of an advantage with time in the latter.

FIG. 4 is a table demonstrating the exponential increase in the absolute difference between the estimated volume of the root system of untreated and treated seed which was then stored for 3 months, demonstrating the maintenance of an advantage in the latter.

DETAILED DESCRIPTION OF THE INVENTION

Figure 1:
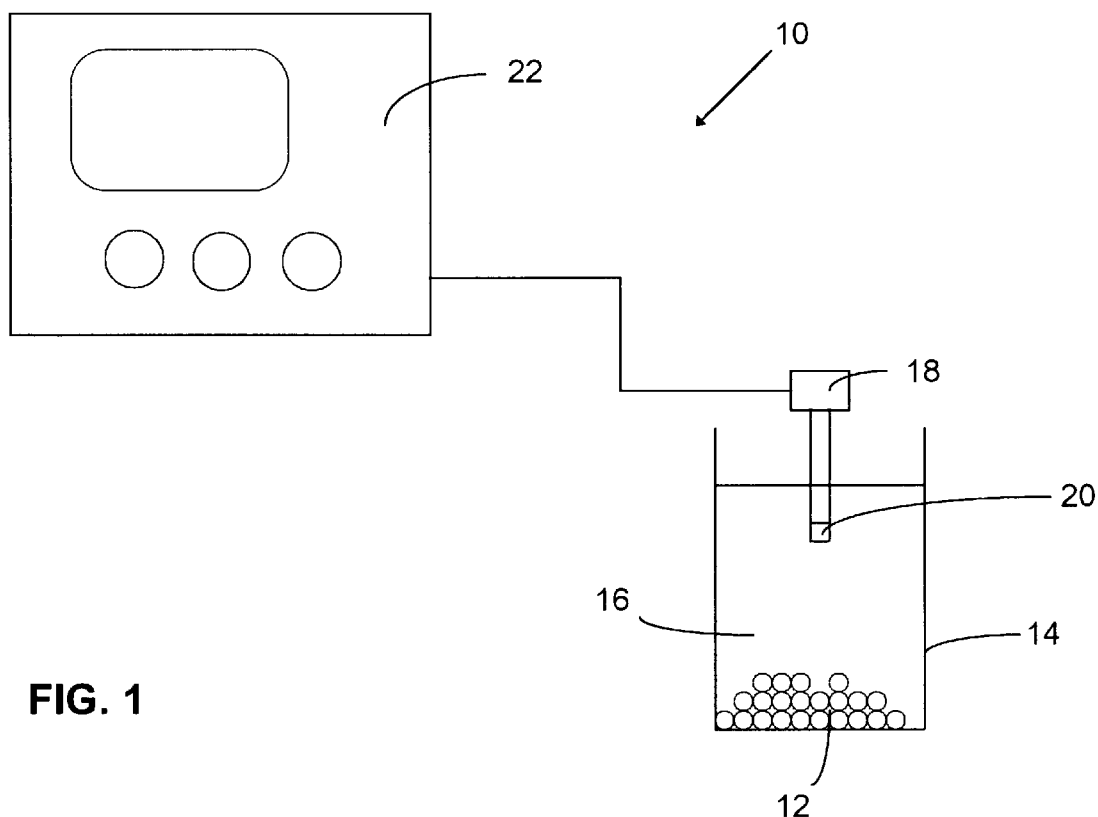
FIG. 1 is a diagrammatic view of the apparatus for practicing the present invention.

There has been found a new method of enhancing the germination of seeds, particularly in decreasing the amount of time from planting of the seeds in the ground to the emergence of primary and other roots and the coleoptile, in generating an advantage maintained in the root system of the seeds, in improving the percent of seeds germinated, and in generating a very significant advantage in germination at temperatures close to 50° F.

The method considerably reduces the time required to initiate germination of seeds, including important agricultural seeds such as corn, by the sonification of such seeds in a liquid medium, preferably water. The sonification is by the application of sound waves at ultrasonic frequencies from between about 15 and 100 kHz, and preferably between about 20 kHz and 30 kHz, with an optimum near 20 kHz.

Ultrasonic energy is applied to the liquid and seed mixture by a sound transducer immersed in the liquid medium. While not wishing to be bound by any particular theory as to the mechanism of the subject invention, it is currently believed that the acoustic energy is carried through the liquid by oscillations of the liquid molecules in the direction of propagation. This produces alternating adiabatic compressions and decompressions together with corresponding increases and decreases in density and temperature. If the periodic decreases of pressure in the liquid are sufficiently high during the negative pressure phase, the cohesive forces of the liquid may be exceeded, at which point small cavities are formed by the process of cavitation. These small cavities then rapidly collapse, producing a very large amplitude shock wave with local temperatures up to a few hundred degrees centigrade or more. The collapse of the cavities are also known to create electrical discharges upon their collapse, giving rise to the effect known as sonoluminescence.

The effects of cavitation are greatly enhanced through the introduction of a variety of gases into the liquid. For example, degassed distilled water requires an energy density level of approximately 1 to 10 watts/cm$^2$ before cavitation occurs. By saturating the water with a noble gas, such as one or more of the inert gases helium, neon, argon, krypton, xenon, or radon, cavitation effects are seen at much lower energy density levels and the effects at energy density levels on the order of 1 to 10 watts/cm$^2$ are greatly enhanced. This effect is believed to be due to the creation of micro-bubbles which more easily form the small cavities upon the application of sonic energy. Additionally, the cavities in the presence of the saturated gas are believed to generate shock waves of larger amplitude upon collapse of the cavities than are achieved with degassed water.

Since cavitation results in mechanical stress (Nyborg, W. L., *Acoust. Soc. Amer.* 44, 1302–13 1968, and Nyborg, W. L., Proc. Workshop, Interaction of ultrasound and biological tissue, Seattle, Wash., 1972), sonification may create or enlarge fissures in the seed coat pericarp similar to scarification, a well-known process by which certain seeds, especially seeds with thick seed coats, are able to germinate. Scarification is believed to accelerate imbibition of water through the pericarp. Simple scarification is unlikely to explain the novel effect disclosed herein, since scanning electron micrographs suggest no increase in the number of fissures in treated seeds, but do indicate a change in pericarp texture. It has found that the sonification process accelerates the imbibition of water. Cavitation may also result in physiological or biochemical changes in the seed which prime the germination process so that upon exposure of the seed to planting conditions, less time is needed for the seed to initiate germination, measured by the time when the radicle pushes through the pericarp. One mechanism proposed for causing physiological or biochemical changes is the production of free radicals by cavitation, Nyborg, W. L., *Acoust. Soc. Amer.* 44, 1302–13 1968, and Nyborg, W. L., Proc. Workshop, Interaction of ultrasound and biological tissue. Seattle, Wash., 1972. It is also possible that the electrical and light energy released by the cavitation effect produces changes in the seed which result in priming of the germination process. It is known, for example, that lettuce, *Lactuca sativa*, seeds require exposure to 660 nm light in order to germinate. While not previously observed in seeds having a thick seed coat, such as corn, it may be that the seed embryo responds to the energy released in the cavitation effect under the conditions of the treatment of the present invention where it would not so react under conditions ordinarily found in nature. Deleterious effects of ultrasound on corn seeds (Weinberger, P., et al., Rad. and Enviromn. Biophys. 16, 81–88 1979) and fodder beans (Rubtsova, I. D., Biofizika 12: No. 3, 489–92, 1967) immersed in water have previously been reported. No previous use of a liquid medium wherein the presence of dissolved gases was controlled are known.

As will be explained more fully below, seeds treated using the apparatus of the present invention wherein degassed distilled water was used as the liquid medium did not exhibit enhanced germination effects. Sporadically observed changes in germination characteristics were small and quite variable from experiment to experiment when tap water was used. On the other hand, when tap water was saturated with argon gas, very surprising and dramatic germination effects were observed and such effects were reproducible from experiment to experiment. Other experiments in which the saturating gas was nitrogen also exhibited enhanced germination effects, but not nearly as pronounced as with argon. Effects similar to that with argon-saturated water were obtained with helium-saturated water, suggesting that other inert gases facilitate the process.

The present method is carried out using an ultrasonic frequency generator for driving a piezoceramic sonicator, the horn of which is immersed in the liquid surrounding the seeds. After sonification, the seeds are dried, and then placed on a water-saturated filter pad or, in some cases, in wet soil, to induce germination. The temperature during germination has been varied to analyze the effect of the treatment on germination at various temperatures. Measurements which have been monitored in different experiments have included the time of emergence of the primary root, the time of emergence of secondary roots, the time for emergence of coleoptile, the root length and weight, the root area, the estimated volume of the root, the coleoptile length and weight, and the uptake of water. The seeds tested were first generation ($F_1$) hybrid seed corn.

Apparatus

The apparatus used in the treatment of seeds according to the present invention is illustrated diagrammatically in FIG. 1, generally at 10. Seeds 12 are placed in a container 14 and covered with a liquid medium 16. A sound transducer 18 is suspended with the horn 20 of the transducer immersed in the liquid medium 16. The transducer is connected to an ultrasonic frequency generator 22. In the preferred embodiment, the sound transducer 18 is a piezoceramnic transducer, Model VCX600 obtained commercially from Sonics and Materials Inc. Alternative transducers may be used. Magnetostrictive transducers are capable of delivering higher levels of sound energy to the liquid media and may be preferably used if higher sound densities are desired, for example if large quantities of seed are to be sonicated. The frequency generator 22 is a Model 33120A obtained commercially from Hewlett Packard and is matched to the transducer 18. It has a frequency range of between 15 kHz and 30 kHz and can supply between zero and 500 watts to the sound transducer 18. In the experiments described herein, the power densities were between 30 watts per $cm^2$ and 80 watts per $cm^2$, although given the rated efficiency of the sound transducer 18, higher power densities can be achieved in the container 14.

Initial Experiments

In the initial experiments to observe the effects of ultrasonification on seed germination, seeds were sonicated in tap water at 22° C. using the piezoceramic sonicator with the wave generator set at 20 kHz. A significant reduction in the average time of germination was observed in one out of five experiments. Since the sonification and soaking of seeds was randomized during the course of each experiment, the results of the one positive experiment suggested that opportunities may exist to optimize the effect.

Because of the wide variability in the observed results of the experiments, the experimental design was modified to include daily observations, quantitation of the germination events, and increases in sample size to produce experimental numbers for statistical analysis. The seed sample size was increased from five to twenty-five seeds in each of the experimental groups. The time of sonification was set at two minutes and the time of soaking in deionized, as opposed to tap, water for the control group of seeds was also ten minutes. Both the control and experimental seeds were dried after treatment, stored overnight and placed in a germination chamber the following morning. The seeds were checked daily for seven days and a record made of the root and coleoptile production as described above. The results of these experiments continued to show great variation.

Addition of Nitrogen Gas

It was hypothesized that variability was due to the purity and the gas content of the water. In particular, dissolved gases importantly act as micro-nuclei upon which cavitation bubbles may form. The experiments were repeated as above; however, degassed, deionized water was used in the control and nitrogen-saturated deionized water was used for sonifications. In these experiments, there was a significant decrease in germination time as measured by length of the apical root and rootlets and length and dry weight of the coleoptile.

Addition of Noble Gases

In the early 1930s, H. Frenzel and H. Schultes, z Phy. Chem. B 27,421 (1934) observed that photographic plates became exposed or "fogged" when submerged in water exposed to high frequency sound. This observation was the first recorded for the emission of light by acoustic waves or "sonoluminescence." The physics of the phenomenon are not well understood. Dr. S. J. Puttnam has demonstrated that the saturation level and type of gas in the water has an effect on the light emission. Nitrogen gas gives a modest light emission, but the noble gases, such as argon, will increase the light emission by orders of magnitude. The reason for this effect is not understood.

Since sonoluminescence is thought to be the result of cavitational forces, an experiment was undertaken to test whether the presence of argon gas in the water surrounding a seed would have a positive effect on germination. Seeds sonicated in the presence of deionized water saturated with argon exhibited a dramatic decrease in germination time, determined by first emergence of the radicle from the pericarp. In one set of experiments, a control corn panel and a sonicated corn panel were set up and observed after 24 hours at room temperature on a water saturated filter pad. Three of the five sonicated kernels had emerging roots the lengths of which were 1.5 times the diameter of the kernel, while only one control used had a small root. In another set of experiments, a control corn panel and a sonicated corn panel were set up and observed after 5 days of culture. It was observed that the sonicated plants still possessed a significant size advantage.

Individual kernels of the publicly available hybrid seed corn variety Pioneer® 3394 were sonicated in 5 ml of water saturated with argon gas. The kernels were submerged for 10 minutes in a polypropylene 12 ml test tube prior to using the sound transducer 18 operating at 40% amplitude (# 630-0418, Sonics and Materials, Inc., Danbury, Conn.) with a ⅛ inch probe. Argon-saturated water was prepared by bubbling pure argon gas through 500 ml of tap water in a side-armed flask at room temperature for a minimum of 20 min. Temperature of the kernel and water in the container was maintained at 15° C. by a water bath. The flask was then sealed and 5 ml aliquots were used for sonification of the kernels. With reference to FIG. 1, the frequency generator 22 and sound transducer 18 were tuned after each kernel was treated and a fresh aliquot of argon-saturated water was used for sonification of each kernel. Control seed was immersed in argon-saturated water also for 10 minutes at 15° C., but not sonicated.

After soaking or sonification, the kernels were blotted dry and placed on water-saturated filter paper in a petri-dish. The petri-dish was covered and incubated in an environment incubator at 25° C. in the dark. Water was added to the filter paper when needed to maintain saturation.

Figure 2:
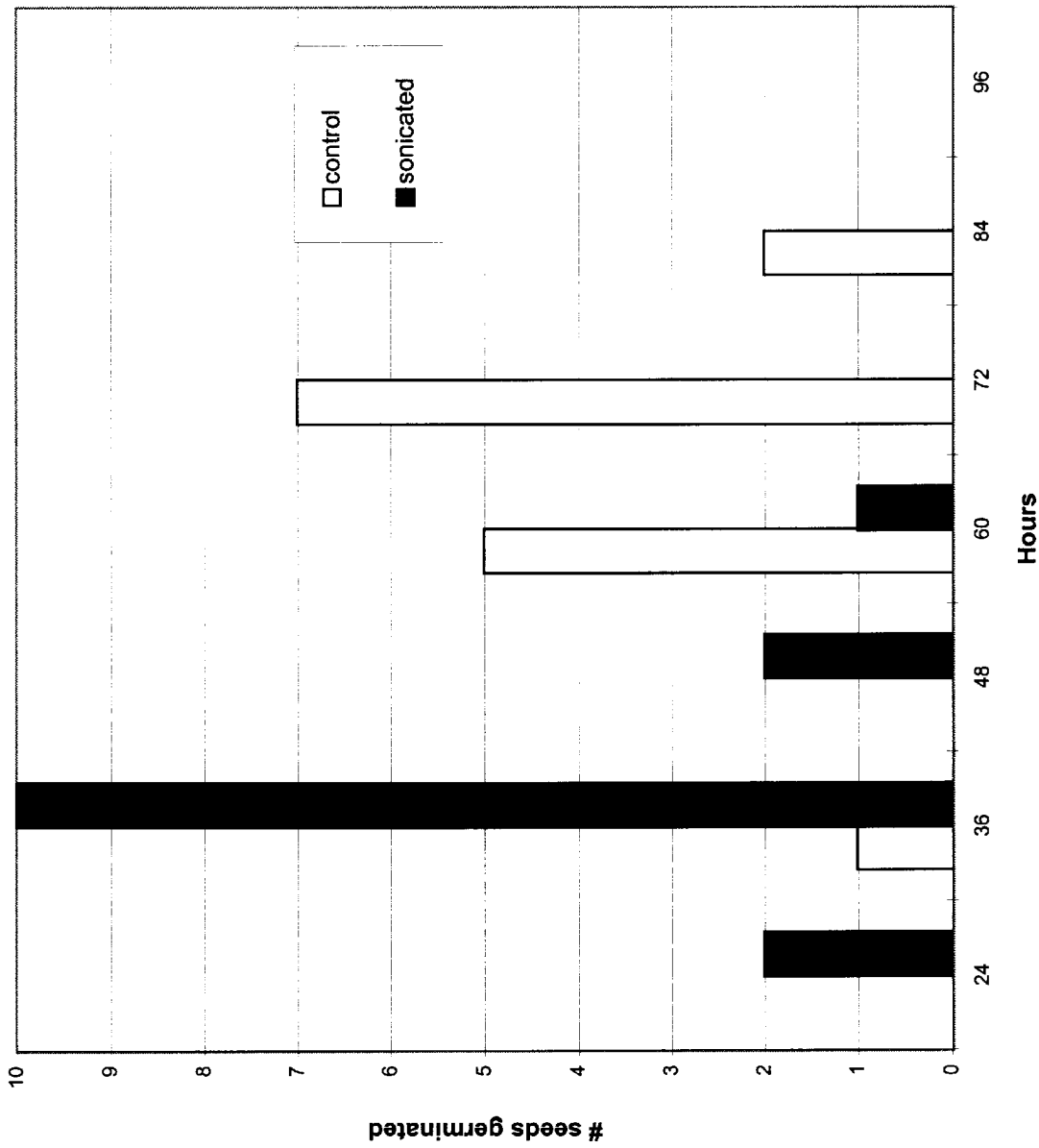
FIG. 2 is a histogram of a number of seeds germinated as a function of time for control and treated seeds demonstrating the decrease in germination time in the latter seeds.

The results of one experiment are presented in FIG. 2. The distribution of germination times for control seeds spanned 60 to 84 hr, which that of sonicated seeds spanned 24 to 60 hours. The mean and standard deviation of germination time of the control and sonicated samples was 37.6±11.8 and 67.2±11.8 hours, respectively. The difference was significant, with a p-value less than 0.01. The experiment described above was repeated five times with highly reproducible results. The difference between the means differed between 30 and 60 hours.

Individual kernels of the publicly available hybrid seed corn variety Pioneer® 3394 were sonicated in 5 ml of water saturated with helium gas. The kernels were submerged for 10 minutes in a polypropylene 12 ml test tube using the sound transducer 18 operating at 40% amplitude (# 630-0418, Sonics and Materials, Inc., Danbury, Conn.) with a ⅛ inch probe. Helium-saturated water was prepared by bubbling pure helium gas through 500 ml of tap water in a side-armed flask at room temperature for a minimum of 20 min. Temperature of the kernel and water in the container was maintained at 15° C. by a water bath. The flask was then sealed and 5 ml aliquots were used for sonification of the kernels. The frequency generator and sound transducer were tuned to 20 kHz initially and after each kernel was treated and a fresh aliquot of helium-saturated water was used for sonification of each kernel. Control seed was immersed in helium-saturated water also for 10 minutes at 15° C., but not sonicated.

After soaking or sonification, the kernels were blotted dry and placed on water-saturated filter paper in a petri-dish. The petri-dish was covered and incubated in an environment incubator at 25° C. in the dark. Water was added to the filter paper when needed to maintain saturation. The timing of germination of the test and control kernels is set out in the following table.

TABLE 1

| | % Germination with time - helium | | | |
|---|---|---|---|---|
| | 0 hours | 24 hours | 48 hours | 72 hours |
| Control | 0 | 1 (3%) | 21 (53%) | 39 (98%) |
| Sonicated | 0 | 9 (23%) | 28 (70%) | 40 (100%) |

Treated Seed Maintains a Size Advantage During Early Growth

To demonstrate that early germinating, sonicated seed maintains a growth advantage in the early stages of development, the roots of control and treated seed were monitored over time for perimeter, area, length, width, and estimated volume, FIG. 3 using the DIAS software package, Solltech, Inc., Iowa City, Iowa, 1995. The most important parameter was the absolute difference in estimated volume, measured in $\mu m^3$. If the size advantage of sonicated seed is maintained, the absolute difference in volume should expand exponentially with time, since growth occurs in an exponentiated fashion. This is exactly the result obtained. the absolute difference is volume between the roots of control and sonicated seed at 48, 56, and 72 hours was 110.7, 234.2, and 590.0 $\mu m^3$. When plotted on a semi-logarithmic plot, a straight line is obtained, demonstrating logarithmic expansion.

Treated Seed Stored for Three Months Maintains a Size Advantage During Early Growth To demonstrate that sonicated seed stored for extended periods of time maintain a growth advantage after early germination, the absolute difference in estimated volume was measured at 48, 56, and 72 hours after seeds were placed on a water-saturated pad. The results again demonstrate that the size advantage expands in an exponential fashion (FIG. 4), the same result obtained with sonicated seed which had not been stored (FIG. 3). The absolute difference in volume between the roots of control and sonicated seed both stored for 3 months at 48, 56, and 72 hours was 92.4, 200.5, and 679.3 $\mu m^3$. When plotted on a semi-logarithmic plot, a straight line is obtained, demonstrating logarithmic expansion.

Stored Treated Seed

To examine the persistence of the seed priming effect, control seeds soaked in argon-saturated water and test seeds sonicated for ten minutes were blotted dry and incubated in the dark for 20 days. The samples were then rehydrated with tap water for 10 minutes and placed on a wetted filter pad. The onset of germination was evident in the treated seed within 24 hours, but not in the control seeds. After 48 hours, robust germination was evident in the 10 sonicated seeds; while the control seed had just begun to germinate. This result was obtained in repeat experiments. In a second series of experiments, control and treated seed were stored for 3 months, then placed on wet filter pads. Again, germination had occurred in all 5 sonicated seeds, but only one of five control seeds after 48 hours. These results demonstrate that the speed-up in germination caused by sonification is maintained during periods of storage at least as long as 3 months.

Although the invention has been described with respect to a preferred embodiment thereof, it is to be also understood that it is not to be so limited since changes and modifications can be made therein which are within the fill intended scope of this invention as defined by the appended claims.

We claim:

1. A method of enhancing germination of seed, comprising the steps of:
    (a) immersing said seed in a liquid solution that includes a dissolved gas;
    (b) introducing into said liquid solution sound energy at a frequency and energy density sufficient to create cavitation in said liquid; and
    (c) sonicating said seed for a period of time sufficient to result in an improved rate of germination of said seeds.

2. A method as defined in claim 1, wherein said solution includes water.

3. A method as defined in claim 1, wherein said gas includes one or more gases selected from the group including helium, neon, argon, krypton, xenon, and radon.

4. A method as defined in claim 1, wherein said solution is degassed water that has been substantially saturated with argon.

5. A method as defined in claim 1, wherein said liquid solution is water substantially saturated with helium.

6. A method as defined in claim 1, wherein said solution is water substantially saturated with a mixture of argon and helium.

7. A method as defined in claim 1, wherein said sound energy is at a frequency of between about 15 kHz and about 100 kHz.

8. A method as defined in claim 1, wherein said sound energy is at a frequency of between about 15 kHz and about 30 kHz.

9. A method as defined in claim 1, wherein said sound energy is at an energy density of between about 1 watt/cm$^2$ and about 10 watts/cm$^2$.

10. A method as defined in claim 1, wherein said sound energy is applied for between about 1 minute and about 15 minutes.

11. A method as defined in claim 1, wherein said enhanced germination is a reduction is the time from placement of said seed in a culture medium to germination of said seed.

12. A method as defined in claim 1, wherein said enhanced germination is an increase in the likelihood that said seed will germinate upon placement in a culture medium.

13. A method as defined in claim 1, wherein said enhanced germination is an increase in the likelihood that said seed will germinate upon placement in a culture medium at reduced temperatures.

14. A method of enhancing germination of seed, comprising the steps of:
  (a) immersing said seed in a solution including water and one or more inert elemental gases;
  (b) introducing sound energy into said solution at a frequency of between about 15 kHz and about 30 kHz and at an energy density of between about 1 watt/cm$^2$ and about 10 watts/cm$^2$; and
  (c) sonicating said seed for between about 1 minute and about 15 minutes.

15. A method as defined in claim 14, wherein:
  (a) said seed is corn seed;
  (b) said frequency is between about 17 kHz and about 25 kHz, said energy density of between about 1 watts/cm$^2$ and about 10 watts/cm$^2$; and
  (c) said corn seed is sonicated from between about 1 minute and about 15 minutes; and
  (d) time of germination of said corn seed is reduced by between about 5 percent and about 70 percent.

16. A method for producing an improved plant from a seed, comprising the steps of:
  (a) immersing said seed in an aqueous solution including one or more dissolved inert elemental gases;
  (b) introducing sound energy into said solution at a frequency of between about 15 kHz and about 30 kHz and at an energy density of between about 1 watt/cm$^2$ and about 10 watts/cm$^2$;
  (c) sonicating said seed for between about 1 minute and about 15 minutes; and
  (d) cultivating said seed.

17. A method as defined in claim 16, further comprising the steps of:
  (a) removing said seed from said solution after said sonication step;
  (b) drying said seed; and
  (c) storing said seed prior to said cultivating step.

18. A method as defined in claim 17, wherein said seed is stored for a period of at least six months and wherein said storage period does not substantially adversely affect said improved plant grown from said seed.

* * * * *